G. W. CHILDS.
Vegetable Cutter.
No. 15,840. Patented Oct. 7, 1856.
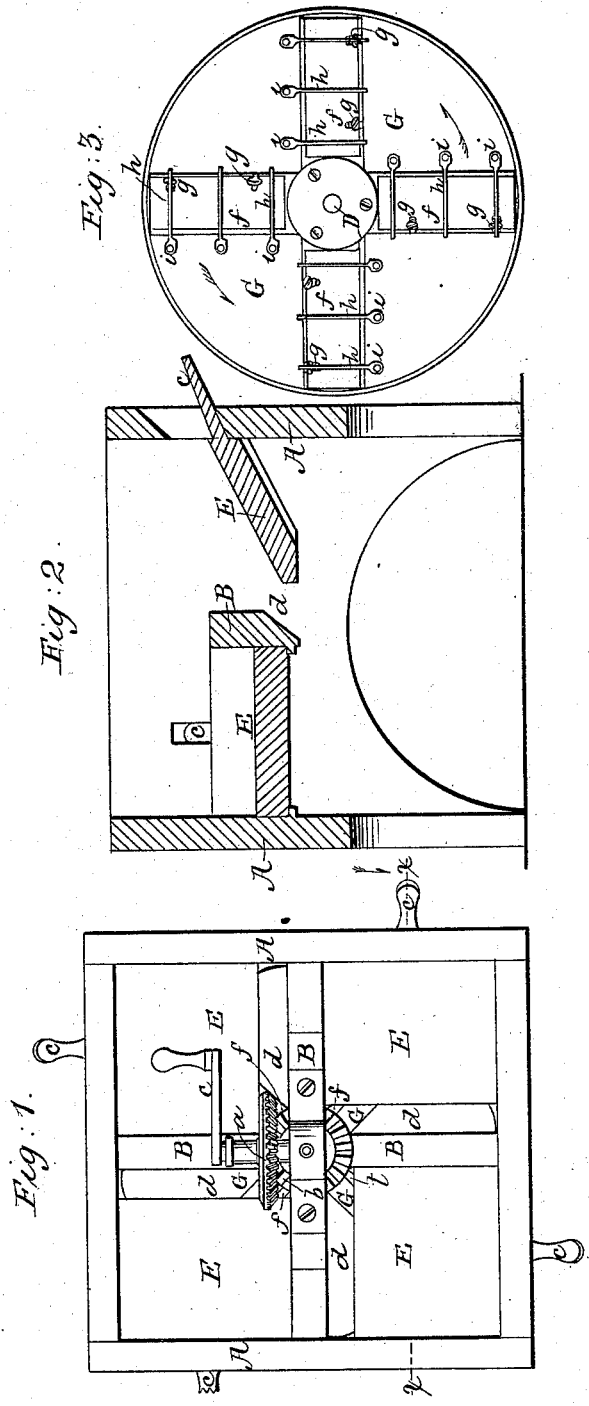

UNITED STATES PATENT OFFICE.

GEO. W. CHILDS, OF LIBERTY, PENNSYLVANIA.

VEGETABLE-CUTTER.

Specification of Letters Patent No. 15,840, dated October 7, 1856.

*To all whom it may concern:*

Be it known that I, GEORGE W. CHILDS, of Liberty, in the county of Tioga and State of Pennsylvania, have invented a new and Improved Vegetable-Cutter; and I do hereby declare that the following is a full and exact description thereof, reference being had to the accompanying drawings, making part of this specification, Figure 1 being a top view of the machine; Fig. 2, a vertical section in the plane $x\ x$ of Fig. 1, and Fig. 3 a view of the under side of the revolving cutter.

Like letters designate corresponding parts in all the figures.

The machine consists of a box A, of suitable form and size, and divided into any desirable number of feeding compartments or hoppers, by cross partitions B, B; and of a cutter G, or disk provided with knives for slicing the vegetables, and revolving horizontally below the feeding compartments. The cutter G, is mounted on a vertical spindle D, and is driven by a crank C, the axis of which is geared to the cutter spindle by the bevel-wheels $a$, $b$.

I employ adjustable, or movable, bottoms E, E, in the hopper compartments, by which the feeding apertures $d$, $d$, may be varied in size, to suit the different kinds of vegetables to be sliced; or for slicing large vegetables, such as pumpkins, cabbages, &c., the bottoms may be removed altogether. They are also arranged so as to vary their inclinations in order to accelerate or retard the movement of the vegetables to the cutter, according to circumstances. Any convenient mode of effecting this adjustment may be adopted; in the drawings the bottoms are represented as sliding on cleats and provided with handles $c$, $c$, projecting through vertical slots in the side of the box. But any other convenient mode may be adopted. At the feeding apertures $d$, $d$, the lower edges of the partitions are beveled, or chamfered, (as seen in Fig. 2,) so that the vegetables will be pressed upon the cutters by the wedge action thereof, and thereby more readily force the slices through the cutters. Said cutter is provided with a suitable number of plane-knives $f$, $f$, secured and adjusted in the apertures of the disk, by means of screws $g$, $g$, (Fig. 3) passing through slots in said knives. By these knives the vegetables are only cut into broad, thin slices. In order to further divide the slices, knives $h$, $h$, are placed across the under side of the knife apertures of the disk, as seen in Fig. 3. The slices are driven through the cutter by the force of the feeding action, and the motion of said cutter. But if the cross knives $h$, $h$, were unmovably or unyieldingly fixed to the disk, it would be difficult to force the slices through. To obviate this, the knives are attached to the disk only at one end, so as to vibrate on pivots $i$, $i$, leaving the rear ends, as the disk revolves, free to yield or separate sufficiently to allow the slices free passage.

What I claim as my invention and desire to secure by Letters Patent is—

The vibrating cross knives $h$, $h$, operating in the manner set forth.

The above specification of my new and improved vegetable cutter, signed and witnessed this 9th day of June, anno Domini 1856.

GEO. W. CHILDS.

Witnesses:
A. J. SOFIELD,
D. W. CANFIELD.